United States Patent
Wei et al.

(10) Patent No.: US 11,092,963 B2
(45) Date of Patent: Aug. 17, 2021

(54) AUTONOMOUS VEHICLE OPERATION BASED ON PASSENGER-COUNT

(71) Applicant: Motional AD LLC, Boston, MA (US)

(72) Inventors: Junqing Wei, Bridgeville, PA (US); Wenda Xu, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 296 days.

(21) Appl. No.: 15/967,862

(22) Filed: May 1, 2018

(65) Prior Publication Data
US 2019/0332112 A1 Oct. 31, 2019

Related U.S. Application Data

(60) Provisional application No. 62/663,456, filed on Apr. 27, 2018.

(51) Int. Cl.
| | |
|---|---|
| *G05D 1/00* | (2006.01) |
| *B60W 30/02* | (2012.01) |
| *B60W 10/18* | (2012.01) |
| *B60W 10/20* | (2006.01) |

(52) U.S. Cl.
CPC ......... *G05D 1/0088* (2013.01); *B60W 30/025* (2013.01); *B60W 10/18* (2013.01); *B60W 10/20* (2013.01); *B60W 2556/00* (2020.02); *B60W 2710/18* (2013.01); *B60W 2710/20* (2013.01)

(58) Field of Classification Search
CPC .................................................... G05D 1/0088
See application file for complete search history.

(56) References Cited

U.S. PATENT DOCUMENTS

| | | | |
|---|---|---|---|
| 9,950,708 B1* | 4/2018 | Cullinane | B60W 30/095 |
| 10,417,910 B2* | 9/2019 | Scofield | B60W 30/143 |
| 2015/0149017 A1 | 5/2015 | Attard et al. | |
| 2016/0200219 A1* | 7/2016 | Tjahjono | G01S 5/0027 340/457 |
| 2017/0267256 A1 | 9/2017 | Minster et al. | |

(Continued)

FOREIGN PATENT DOCUMENTS

| | | |
|---|---|---|
| EP | 3200169 | 8/2017 |
| WO | WO 2015057144 | 4/2015 |

(Continued)

OTHER PUBLICATIONS

EP Extended Search Report in European Application No. 19171299.1, dated Oct. 2, 2019, 7 pages.

(Continued)

*Primary Examiner* — Alex C Dunn
(74) *Attorney, Agent, or Firm* — Fish & Richardson P.C.

(57) ABSTRACT

A system for operating an autonomous vehicle includes a passenger-detector and a controller-circuit. The passenger-detector is operable to determine a passenger-count of passengers present in a host-vehicle. The controller-circuit is in communication with the passenger-detector and vehicle-controls of the host-vehicle. The controller-circuit is configured to operate the host-vehicle in an autonomous-mode and in accordance with a parameter. The parameter is set to an empty-value when passenger-count is equal to zero, and the parameter is set to an occupied-value different from the empty-value when the passenger count is greater than zero.

13 Claims, 2 Drawing Sheets

(56) References Cited

U.S. PATENT DOCUMENTS

2017/0282912 A1    10/2017  Chan et al.
2018/0050664 A1     2/2018  Tarte
2018/0105157 A1     4/2018  Wang et al.
2018/0105175 A1*    4/2018  Muller .................. G05D 1/021
2019/0295417 A1*    9/2019  Hiramatsu ............ B60W 50/10

FOREIGN PATENT DOCUMENTS

WO    WO 2016195566     12/2016
WO    WO 2018/030987     2/2018

OTHER PUBLICATIONS

DK Office Action in Danish Appln. No. PA201870720, dated Nov. 4, 2019, 9 pages.
DK 2nd Office Action in Danish Appln. No. PA 2018 70720, dated Sep. 21, 2020, 5 pages.
DK 3rd Office Action in Danish Appln. No. PA 2018 70720, dated Feb. 25, 2021, 4 pages.

* cited by examiner

AUTONOMOUS VEHICLE OPERATION BASED ON PASSENGER-COUNT

TECHNICAL FIELD OF INVENTION

This disclosure generally relates to a system for operating an autonomous vehicle, and more particularly relates to system that operate the host-vehicle in an autonomous-mode and in accordance with a parameter, wherein the parameter is set to an empty-value when passenger-count is equal to zero, and the parameter is set to an occupied-value different from the empty-value when the passenger count is greater than zero.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
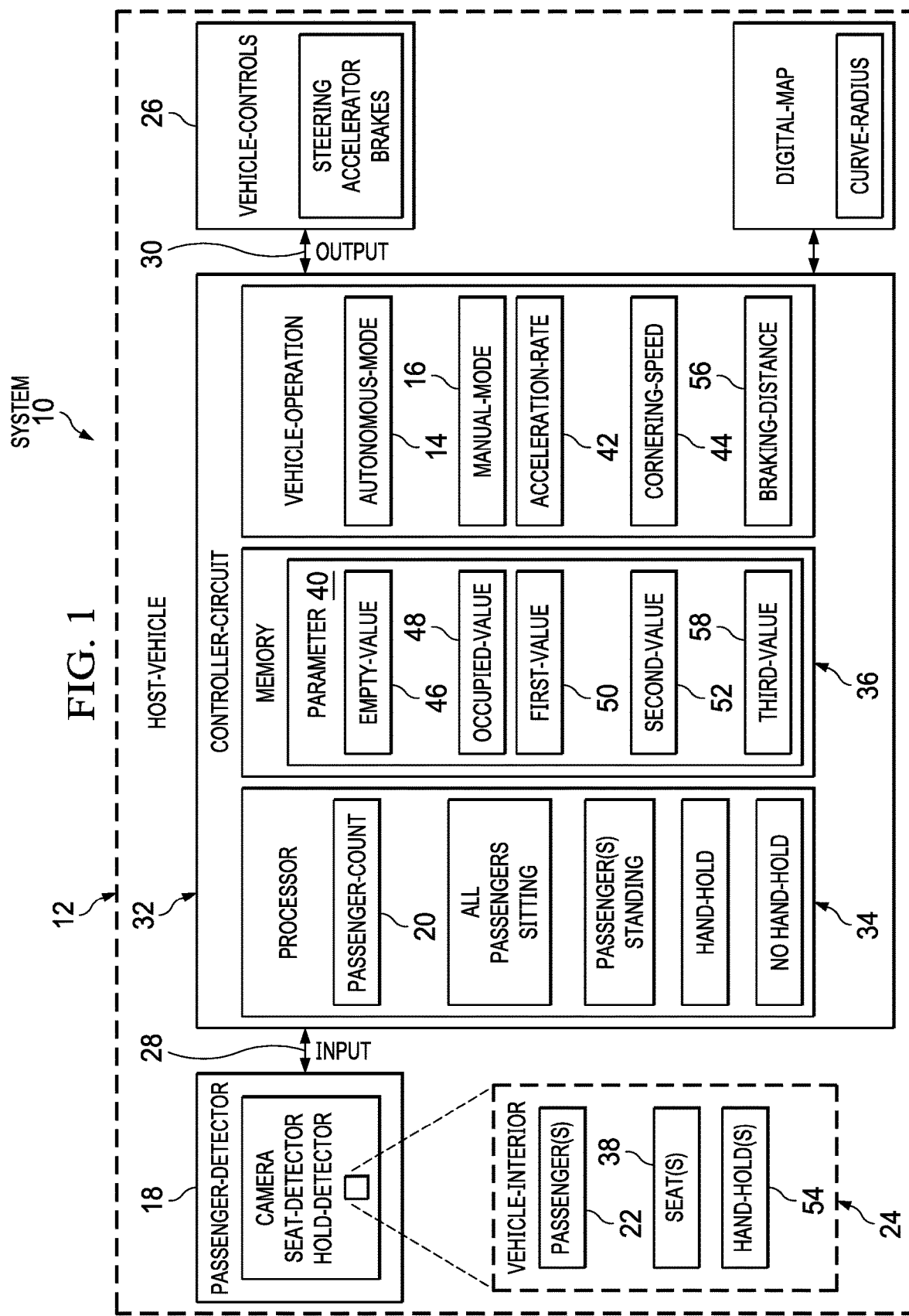
FIG. 1 is a diagram of a system for operating an autonomous vehicle in accordance with one embodiment.

FIG. 1 illustrates a non-limiting example of a system 10, for operating an autonomous vehicle, e.g. a host-vehicle 12. The host-vehicle 12 may be characterized as an autonomous or automated vehicle. As used herein, the term autonomous vehicle may apply to instances when the host-vehicle 12 is being operated in an autonomous-mode 14, i.e. a fully autonomous mode or fully automated mode, where a human-operator (not shown) of the host-vehicle 12 may not be present in the host-vehicle 12, or the human-operator may do little more than designate a destination to operate the host-vehicle 12. The human-operator may also serve as a backup if problems arise with the autonomous operation of the host-vehicle. However, full automation is not an absolute requirement. It is contemplated that the teachings presented herein are useful when the host-vehicle 12 is operated in a manual-mode 16 where the degree or level of automation may be little more than providing an audible or visual warning to the human-operator who is generally in control of the steering, accelerator, and brakes of the host-vehicle 12. For example, the system 10 may merely assist the human-operator as needed to operate the host-vehicle 12 in a manner comparable to that described herein for the autonomous-mode 14.

As will become clear in the description that follows, the host-vehicle 12 may be: a small automated-mobility-on-demand (AMOD) type of vehicle that may be capable of transporting, for example, up to six passengers, a personal-vehicle for transporting up to six or more passengers, a small automated-taxi for up to four passengers, or an automated-bus for transporting up to sixty or more passengers. As will be described in more detail below, one aspect of the system 10 described herein is that the system 10 advantageously operates the host-vehicle 12 in a different manner when the host-vehicle 12 is empty, i.e. there are no passengers in the host-vehicle 12, versus when one or more passengers are present in the host-vehicle 12. As a non-limiting example, when operating the autonomous-mode 14, the host-vehicle 12 may accelerate faster when the host-vehicle 12 is empty than the host-vehicle 12 does when passengers are present in the host-vehicle 12.

The system 10 includes a passenger-detector 18 operable to determine a passenger-count 20 of passengers 22 present in a vehicle-interior 24 of the host-vehicle 12. The passenger-detector 18 may include, but is not limited to, one or more instances of a camera and/or an ultrasonic-transducer oriented to have a field-of-view that covers all or part of the vehicle-interior 24, a seat-detector such as a weight-detector or an electrode installed in each seat 38 in the vehicle-interior 24, which may be configured or used to detect an occupant-presence and/or an occupant-weight of whatever occupies in each seat 38, or any combination thereof, as will be recognized by those in the vehicle occupant/passenger detection arts.

The host-vehicle 12 is equipped with vehicle-controls 26 that allow for or enable operation of the host-vehicle 12 in the autonomous-mode 14, i.e. a driver-less mode. A variety of devices and components to enable the vehicle-controls 26 for operation of the host-vehicle 12 are commercially available, as will be recognized by those in the art. The vehicle-controls 26 include, but are not limited to, the means to control the steering, the accelerator, and the brakes of the host-vehicle 12. Other non-limiting examples of other features of the host-vehicle 12 that can be autonomously operated include interior lights, entry/exit doors, destination announcements, and the like.

The system 10 includes a controller-circuit 32, hereafter sometimes referred to as the controller 32, which is in communication with the passenger-detector (via an input 28 to the controller 32 and the vehicle-controls 26 via an output 30 of the controller 32. The controller 32 may include one or more instances of a processor 34 such as one or more instances of a microprocessor or other control circuitry such as analog and/or digital control circuitry including an application specific integrated circuit (ASIC) for processing data as should be evident to those in the art. While the system 10 described herein is generally described in terms of having a single instance of the controller 32, it is recognized that the functions of the controller 32 may be shared or distributed among several instances of controllers that are each configured for some specific task. Hereafter, any reference to the controller 32 being configured for something is to also be interpreted as suggesting that the processor 34 may also be configured for the same thing. The controller 32 may include memory 36, i.e. non-transitory computer-readable storage-medium, including non-volatile memory, such as electrically erasable programmable read-only memory (EEPROM) for storing one or more routines, thresholds, and captured data. The memory 36 may be part of the processor 34, or part of the controller 32, or separate from the controller 32 such as remote memory stored in the cloud. The one or more routines may be executed by the controller 32 or the processor 34 to perform steps (FIG. 2) for operating the host-vehicle 12 in the autonomous-mode 14 based on signals received by the controller 32 as described herein.

The controller 32 is configured to operate the host-vehicle 12 in the autonomous-mode 14 and in accordance with a parameter 40. As used herein, the parameter 40 refers to a dynamic characteristic that can affect the comfort of one or more of the passengers 22 being transported by the host-vehicle 12. Non-limiting examples of the parameter 40 include, but are not limited to an acceleration-rate 42 (e.g. longitudinal acceleration, longitudinal deceleration), a cornering-speed 44 (i.e. lateral acceleration), and a maximum speed. That is, aggressive acceleration from a stop, aggressive braking, traveling too fast around corners or curves, and sudden or frequent lane changes can make the transportation experience unpleasant for the passengers 22. The parameter 40 helps to set limits on these actions (accelerating, braking, cornering) so that the transportation experience for the passengers 22 is pleasant, or at least as pleasant as possible.

The controller 32 is configured to set the parameter 40 to an empty-value 46 when the passenger-count 20 is equal to zero, i.e. the host-vehicle 12 is empty of passengers, and the parameter 40 is set to an occupied-value 48 that is different from the empty-value 46 when the passenger-count 20 is greater than zero, i.e. there is at least one passenger is present in the host-vehicle 12. That is, the value of the parameter 40 used to control or limit certain operational characteristics such as longitudinal acceleration while the host-vehicle 12 is empty is different from the value of the parameter 40 used while there are one or more instances of the passengers 22 in the host-vehicle 12.

By way of example, the acceleration-rate 42 may be limited to a relatively low value, e.g. three kilometers-per-hour-per-second (3 kph/s), when host-vehicle 12 is occupied, and faster, e.g. ten kilometers-per-hour-per-second (10 kph/s) or the maximum acceleration capability of the host-vehicle 12, when the host-vehicle 12 is empty. That is, when the parameter 40 is the acceleration-rate 42 of the host-vehicle 12, then the empty-value 46 is greater than the occupied-value 48. Increasing the values used for the acceleration-rate 42 and the cornering-speed 44 while the host-vehicle 12 is empty is advantageous because the host-vehicle 12 can travel more quickly to a destination where people are waiting to be picked-up by the host-vehicle 12.

By way of another example, the cornering-speed 44 for a given corner may be slower when host-vehicle 12 is occupied. That is, when the parameter is the cornering-speed 44, then the empty-value 46 is greater than the occupied-value 48. In other words, the host-vehicle 12 travels through a given corner at a slower speed when the host-vehicle 12 is occupied as compared to when the host-vehicle 12 is empty. The cornering-speed 44 for either condition, occupied or empty, may be determined based on a curve-radius and/or a camber of the given curve, which may be indicated on a digital-map used by the controller 32 for navigation. For example, the cornering-speed 44 may be characterized as the lateral-acceleration that a passenger experiences, where the empty-value is 0.5 g of lateral-acceleration, and the occupied-value is 0.1 g of lateral acceleration. Alternatively, the cornering-speed 44 may be determined based on a posted recommended speed for the corner in question.

In some examples of the host-vehicle 12 such as a small AMOD, automated taxi, or personal vehicle, the only option for the passengers 22 is to be seated because, for example, the ceiling height of the host-vehicle 12 is too low to stand. However, in other examples of the host-vehicle 12 that could be generally classified as a bus, passengers 22 may be able to stand. Since standing passengers may be more affected by some types of acceleration when compared to sitting passengers, the controller 32 may be configured to further slow the acceleration-rate 42 (and/or the deceleration-rate) and/or the cornering-speed 44 when one or more instances of the passengers 22 is/are standing rather than sitting.

To this end, if the host-vehicle 12 is configured so the passengers 22 can sit or stand while the host-vehicle 12 is moving, then the passenger-detector 18 may be advantageously configured to, or operable to, determine that one or more instances of the passengers 22 is/are standing instead of sitting. For example, an image from the camera may be analyzed to determine if there is a person at a location where there is no seat, as so is presumed to be standing. It follows that the controller-circuit 32 may be configured to set the parameter 40 to a first value 50 in response to a determination that all the passengers 22 are sitting, and a second-value 52 different from the first-value 50 in response to a determination that at least one of the passengers 22 is standing. Regarding the values used for the acceleration-rate 42 and the cornering-speed 44, the second value would be less than the first-value 50 so the passengers 22 that are standing can more easily keep their balance. By contrast, if all the passengers 22 are sitting, then the values used for the acceleration-rate 42 and the cornering-speed 44 can be increased and thereby reduce travel-time. It is recognized that the occupied-value 48 may be equal to the first-value 50. That different names are used for those values is only to provide a way to distinguish a smaller version (e.g. automated taxi) of the host-vehicle 12 where the passengers 22 may all be sitting facing forward and wearing seatbelts from a larger version (e.g. bus) where some or all the seated passengers may be sitting sideways with respect to the direction of travel, and/or are not wearing seatbelts.

Most busses or other-vehicles that are configured so the passengers 22 can stand also proved various configurations of hand-holds 54 such as poles or overhead-straps. However, if one or more instances of the passengers 22 is unable to grasp an instance of the hand-holds 54, it may be advantageous if the passenger-detector 18 is operable to determine when at least one passenger is standing and is not contacting or is not gripping a hand-hold 54. The hand-holds 54 may be equipped with electrical contacts that can be used to detect a change in capacitance or resistance that would be indicative of a passenger making contact or gripping an instance of the hand-holds 54. If the controller 32 determines that at least one passenger is standing and is not contacting or is not gripping a hand-hold 54, then the parameter may be set to a third-value 58 different from (e.g. less than) the first-value and the second-value in response to a determination that at least one passenger is standing and is not gripping a hand-hold, or there is no hand-hold available or within reach to grip. That is, for example, the acceleration-rate 42 when at least one passenger is standing and is not contacting or is not gripping a hand-hold 54 is less than or slower than when all passengers are seated and when some or all the passengers are standing and all the passengers have a grip on a hand-hold 54.

It is recognized that decreasing the acceleration-rate 42 for the various conditions described above typically increases the braking-distance 56 of the host-vehicle 12. It is also recognized that the increased vehicle-weight due to the passengers 22 in the host-vehicle 12 also increases the braking-distance 56. Accordingly, the controller 32 may be configured to estimate the braking-distance 56 of the host-vehicle in accordance with the passenger-count 20.

Figure 2:
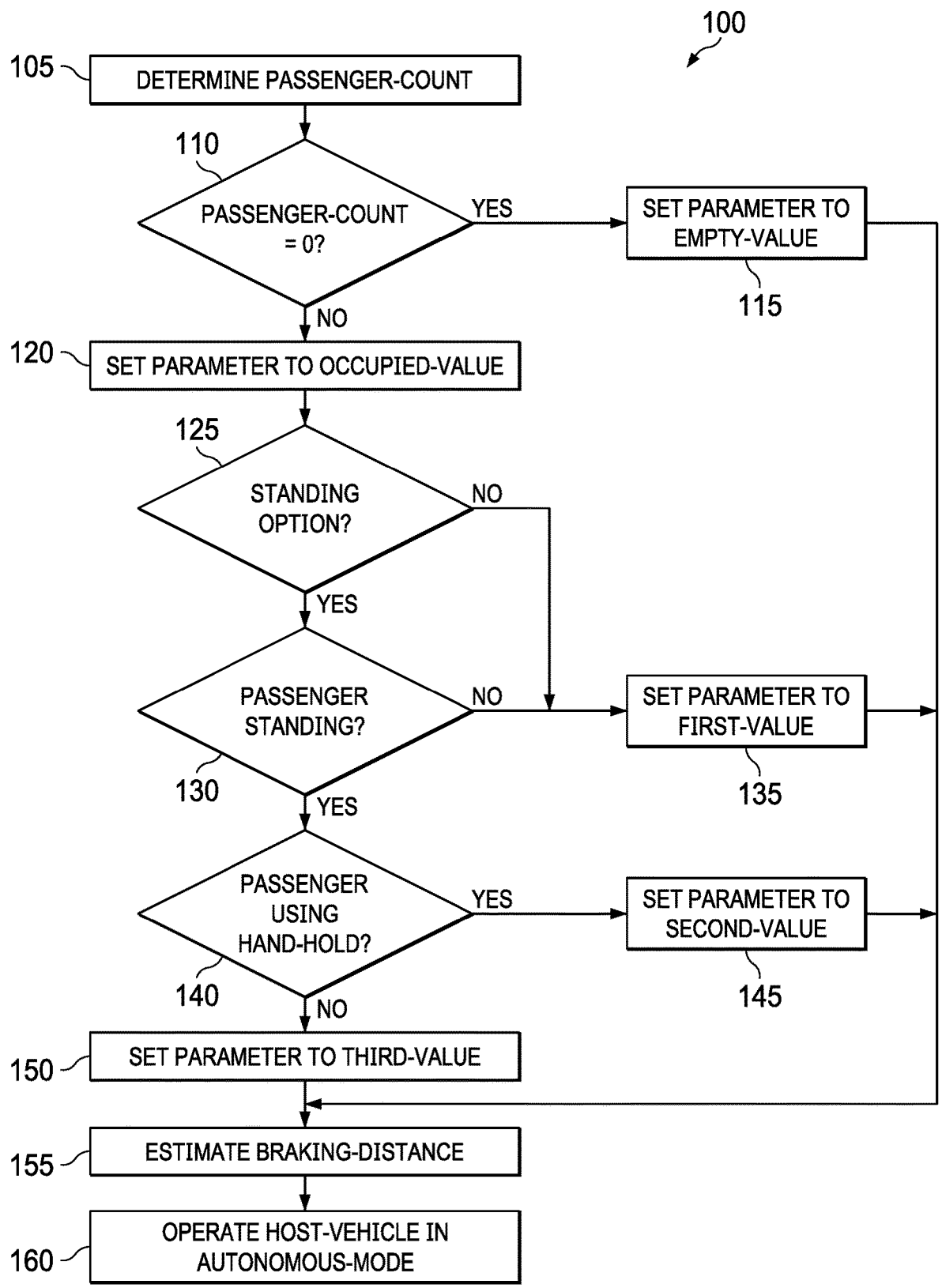
FIG. 2 is a method of operating the system of FIG. 1 in accordance with one embodiment.

FIG. 2 illustrates a non-limiting example of a method 100 of operating the system 10 described above.

Step 105, DETERMINE PASSENGER-COUNT, may include determining, using a passenger-detector 18, a passenger-count 20 of passengers 22 present in a host-vehicle 12. The passenger-detector 18 may include a camera so image analysis can be used to determine the passenger-count 20. Alternatively, weight-sensors and/or proximity-sensors can be located at the door to the host-vehicle 12 to keep a tally of people entering and exiting the host-vehicle 12. It is also contemplated that the seats 38 in the host-vehicle 12 could be equipped with weight-sensors and/or proximity-sensors used to determine when a seat is occupied.

Step 110, PASSENGER-COUNT=0?, may include the controller 32 or the processor 34 determining that the host-vehicle 12 is empty of passengers. In addition to the suggestions above regarding keeping track of the number of passengers, additional sensor such as infrared sensors may be used to determine that the host-vehicle 12 is indeed empty.

Step 115, SET PARAMETER TO EMPTY-VALUE, may include setting a parameter 40 used for operating the host-vehicle 12 in an autonomous-mode 14 to an empty-value 46 in response to the determination that the passenger-count 20 is equal to zero. When the host-vehicle 12 is empty, the operation of the host-vehicle can be more aggressive to a degree that would be unpleasant for a passenger 22 if one or more were on-board the host-vehicle 12. The empty-value 46 is different from an occupied-value 48 that is used in response to a determination that the passenger-count 20 is the passenger count is greater than zero.

Step 120, SET PARAMETER TO OCCUPIED-VALUE, may include setting the parameter 40 used for operating the host-vehicle 12 in an autonomous-mode 14 to the occupied-value 48 in response to a determination that the passenger count is greater than zero. The parameter 40 may be an acceleration-rate 42 of the host-vehicle 12, and the empty-value 46 is characterized as greater than the occupied-value 48. Alternatively, or additionally, the parameter 40 may be a cornering-speed 44 of the host-vehicle 12, and the empty-value 46 is greater than the occupied-value 48.

Step 125, STANDING OPTION?, may include configuring the host-vehicle 12 so a passenger can sit or stand while the host-vehicle 12 is moving. The controller 32 may be configured to be used for a variety of vehicles, e.g. small automated taxies and automated busses. To adjust or calibrate the controller 32 or the processor for a specific type of vehicle, that the host-vehicle 12 is configured to allow the passengers 22 to stand may be determined a flag or bit that is set in the memory 36 when the controller 32 is installed in the host-vehicle 12.

Step 130, PASSENGER STANDING?, may include determining, using the passenger-detector 18, that one or more of the passengers 22 is/are standing. This may be done by way of image analysis and/or weight detection in the area where the passengers 22 may stand.

Step 135, SET PARAMETER TO FIRST-VALUE, may include setting the parameter 40 to a first value 50 in response to a determination that all passengers 22 are sitting. In a host-vehicle 12 configured so all or some of the passengers 22 can choose to stand, the host-vehicle 12 can operate more aggressively if all passengers are seated, and thereby arrive at a destination more quickly than is the case when all or some of the passengers 22 stand.

Step 140, PASSENGER USING HAND-HOLD?, may include determining that at least one passenger is standing and is not gripping a hand-hold 54. If all the passengers 22 that are standing are gripping at least one of the hand-holds 54, then the host-vehicle 12 may operate more aggressively (see step 145) that is the case if one or more of the passengers 22 who are standing.

Step 145, SET PARAMETER TO SECOND-VALUE, may include setting the parameter 40 to a second-value 52 different from the first-value 50 in response to a determination that at least one passenger is standing is not gripping a hand-hold 54. By way of example, the second-value 52 is less than the first-value 50 if the parameter 40 is the acceleration-rate 42.

Step 150, SET PARAMETER TO THIRD-VALUE, may include setting the parameter 40 to a third-value 58 different from the first-value 50 and the second-value 52 in response to a determination that at least one passenger is standing and is not gripping a hand-hold 54. By way of example, the third-value 58 is less than the second-value 52 if the parameter 40 is the acceleration-rate 42.

Step 155, ESTIMATE BRAKING-DISTANCE, may include estimating a braking-distance 56 of the host-vehicle 12 in accordance with the passenger-count 20. The added weight of the passengers 22 can increase the safe braking-distance, especially if road conditions are icy for example.

Step 160, OPERATE HOST-VEHICLE IN AUTONOMOUS-MODE, may include operating, using a controller-circuit 32, the host-vehicle 12 in the autonomous-mode 14 and in accordance with the parameter 40.

Described herein is a first device 32 that includes one or more processors 34, memory 36, and one or more programs 110-160 stored in the memory 36. The one or more programs 110-160 including instructions for performing all or part of the method 100. Also, described herein is a non-transitory computer-readable storage-medium 36 that includes one or more programs 110-160 for execution by one or more processors 34 of a first device 32, the one or more programs 110-160 including instructions which, when executed by the one or more processors 34, cause the first device to perform all or part of the method 100.

Accordingly, a system 10, a controller 32 for the system 10, and a method 100 of operating the system 10 are provided. The automated operation of the host-vehicle 12 is varied in accordance with how many passengers are in the host-vehicle 12. When the host-vehicle 12 is empty the host-vehicle 12 can be operated more aggressively so a destination can be reached more quickly. Further reductions in aggressiveness are applied when any of the passengers 22 are standing, and even further reductions are applied when a standing passenger is not using a hand-hold.

While this invention has been described in terms of the preferred embodiments thereof, it is not intended to be so limited, but rather only to the extent set forth in the claims that follow.

We claim:

1. A system for operating an autonomous vehicle, said system comprising:
    a passenger-detector operable to determine a passenger-count of passengers present in a host-vehicle;
    a controller-circuit in communication with the passenger-detector and vehicle-controls of the host-vehicle, said controller-circuit configured to operate the host-vehicle in an autonomous-mode and in accordance with a parameter, wherein the parameter is set to an empty-value when passenger-count is equal to zero, and the parameter is set to an occupied-value different from the empty-value when the passenger count is greater than zero,
    wherein the host-vehicle is configured so a passenger can sit or stand while the host-vehicle is moving, the passenger-detector is operable to determine that the passenger is sitting or standing, and the controller-circuit is configured to set the parameter to a first value in response to a determination that all passengers are sitting, and a second-value different from the first-value in response to a determination that at least one passenger is standing, and
    wherein the passenger-detector is operable to determine when at least one passenger is standing and is not gripping a hand-hold, and the parameter is set to a third-value different from the first-value and the second-value in response to a determination that the at least one passenger is standing and is not gripping a hand-hold.

2. The system in accordance with claim 1, wherein the parameter is an acceleration-rate of the host-vehicle, and the empty-value is greater than the occupied-value.

3. The system in accordance with claim 1, wherein the parameter is a cornering-speed of the host-vehicle, and the empty-value is greater than the occupied-value.

4. The system in accordance with claim 1, wherein the controller-circuit is configured to estimate a braking-distance of the host-vehicle in accordance with the passenger-count.

5. A controller-circuit for operating an autonomous vehicle, said controller-circuit comprising:
    an input configured to communicate with a passenger-detector operable to determine a passenger-count of passengers present in a host-vehicle;
    an output configured to communicate with vehicle-controls of the host-vehicle;
    a processor in communication with the passenger-detector and vehicle-controls of the host-vehicle, said processor configured to operate the host-vehicle in an autonomous-mode and in accordance with a parameter, wherein the parameter is set to an empty-value when passenger-count is equal to zero, and the parameter is set to an occupied-value different from the empty-value when the passenger count is greater than zero,
    wherein the host-vehicle is configured so a passenger can sit or stand while the host-vehicle is moving, the passenger-detector is operable to determine that the passenger is sitting or standing, and the controller-circuit is configured to set the parameter to a first value in response to a determination that all passengers are sitting, and a second-value different from the first-value in response to a determination that at least one passenger is standing, and
    wherein the passenger-detector is operable to determine when the at least one passenger is standing and is not gripping a hand-hold, and the parameter is set to a third-value different from the first-value and the second-value in response to a determination that the at least one passenger is standing and is not gripping a hand-hold.

6. The controller-circuit in accordance with claim 5, wherein the parameter is an acceleration-rate of the host-vehicle, and the empty-value is greater than the occupied-value.

7. The controller-circuit in accordance with claim 5, wherein the parameter is a cornering-speed of the host-vehicle, and the empty-value is greater than the occupied-value.

8. The controller-circuit in accordance with claim 5, wherein the processor is configured to estimate a braking-distance of the host-vehicle in accordance with the passenger-count.

9. A method for operating an autonomous vehicle, said method comprising:
    determining, using a passenger-detector, a passenger-count of passengers present in a host-vehicle;
    setting a parameter used for operating the host-vehicle in an autonomous-mode to an empty-value in response to a determination that the passenger-count is equal to zero, wherein the empty-value parameter is different from an occupied-value that is used in response to a determination that the passenger-count is the passenger count is greater than zero; and
    operating, using a controller-circuit, the host-vehicle in the autonomous-mode and in accordance with the parameter,
    wherein the host-vehicle is configured so a passenger can sit or stand while the host-vehicle is moving, said method includes determining, using the passenger-detector, that the passenger is sitting, setting the parameter to a first value in response to a determination that all passengers are sitting, and setting the parameter to a second-value different from the first-value in response to a determination that at least one passenger is standing, and
    wherein the method further includes determining that at least one passenger is standing and is not gripping a hand-hold; and
    setting the parameter to a third-value different from the first-value and the second-value in response to a determination that the at least one passenger is standing and is not gripping a hand-hold.

10. The method in accordance with claim 9, wherein the method includes setting the parameter used for operating the host-vehicle in an autonomous-mode to the occupied-value in response to a determination that the passenger count is greater than zero.

11. The method in accordance with claim 9, wherein the parameter is an acceleration-rate of the host-vehicle, and the empty-value is greater than the occupied-value.

12. The method in accordance with claim 9, wherein the parameter is a cornering-speed of the host-vehicle, and the empty-value is greater than the occupied-value.

13. The method in accordance with claim 9, wherein method includes estimating a braking-distance of the host-vehicle in accordance with the passenger-count.

* * * * *